United States Patent [19]
Steinhilber et al.

[11] Patent Number: 5,131,512
[45] Date of Patent: Jul. 21, 1992

[54] HYDRAULIC TELESCOPIC DAMPER

[75] Inventors: Friedhelm Steinhilber, Schauinslandweg 13, 7210 Rottweil; Ludwig Bantle, Bosingen; Heinz Frochte, Zimmern, all of Fed. Rep. of Germany

[73] Assignee: Friedhelm Steinhilber, Rottweil, Fed. Rep. of Germany

[21] Appl. No.: 609,532

[22] Filed: Nov. 6, 1990

[30] Foreign Application Priority Data

Nov. 9, 1989 [DE] Fed. Rep. of Germany ....... 3937306

[51] Int. Cl.⁵ .............. F16F 9/00; F16F 9/50; F16F 7/00; B60G 13/00
[52] U.S. Cl. ................. 188/322.19; 188/282; 188/284; 267/226; 267/127
[58] Field of Search ........... 188/322.19, 284, 282, 188/317; 267/226, 127, 139

[56] References Cited

U.S. PATENT DOCUMENTS

| 2,838,300 | 4/1957 | Gray | 188/322.19 |
| 3,151,706 | 10/1964 | Dillenburger et al. | 188/322.19 |
| 3,893,550 | 7/1975 | San Pablo De La Rosa | 188/322.19 |

FOREIGN PATENT DOCUMENTS

| 3225559 | 8/1972 | Fed. Rep. of Germany . |
| 2659491 | 7/1978 | Fed. Rep. of Germany . |

*Primary Examiner*—Joseph F. Peters, Jr.
*Assistant Examiner*—Kenneth Lee
*Attorney, Agent, or Firm*—Mason Fenwick & Lawrence

[57] ABSTRACT

In a hydraulic telescopic damper with a cylinder (10) and a piston (12) which has a check valve (O-ring 18) and a narrow opening (22), a valve member (30) is mounted on the side of piston (12) away from the pressure side. Valve member (30) is urged by the force of a spring (36) in a locking position of piston (12) and keeps opening (22) closed. The telescopic damper thereby locks automatically. Exerting an additional manual force on the piston rod can release the self-locking action once more.

6 Claims, 2 Drawing Sheets

HYDRAULIC TELESCOPIC DAMPER

The invention relates to a hydraulic telescopic damper according to the preamble of claim 1.

Telescopic dampers are preferably used in instrument lids, housing covers, and the like in order to permit nearly zero-resistance opening of the lid or cover and to damp the closing movement of the lid or cover.

DE 26 59 491 C2 teaches a gas spring with the features according to the species. In this gas spring, the valve member is held in the position blocking the opening by a cup spring. The cup-spring abuts the piston rod of the piston. When the piston rod is extended with the piston to open a valve abutted by the gas spring, the check valve opens so that the piston moves with nearly zero resistance. If the extension movement of the piston rod is interrupted, the piston is pushed back by the weight of the valve and the check valve closes. The small opening is closed by the valve member held by the compression spring against the pressure on the pressure side of the piston. Hence, the piston rod cannot be pushed in any further and holds the valve in the respective open position. To close the valve, it is pushed down manually and the piston rod slid in. As a result the pressure on the pressure side of the piston rises and opens the valve member against the force of the compression spring. This allows the compression rod to be slid in. As soon as the manual pressure on the valve is slackened, the compression spring recloses the valve member and the gas spring is locked once more. This known gas spring therefore locks in all piston positions, in other words, in every open position of the valve. To close the valve, it must be pushed down manually for the entire distance required to close it.

DE 32 25 559 A1 teaches an automatic door closer with a hydraulic damper in which the piston automatically locks in the open position. For this purpose a valve tube is provided as an opening on the piston, said tube resting, in the locking position, on a valve arrangement mounted on the bottom of the cylinder and containing a check valve. The hydraulic damper permits the opening motion of the door to be arrested in the end area. If the door is pressed manually in the closing direction out of this locking area, the locking action is suspended. The closing motion follows automatically, with damping. Automatic locking is very complicated in design in this known hydraulic damper.

The goal of the invention is to provide a hydraulic telescopic damper which is simple in design, locks automatically in an end position, and permits damped motion following manual movement out of the locking position.

This goal is achieved in a telescopic damper of the species recited at the outset according to the invention by the features of the characterizing clause of claim 1.

Advantageous embodiments of the invention are listed in the subclaims.

In the telescopic damper according to the invention, a valve member is associated with the narrow opening in the piston through which the hydraulic fluid flows to damp the motion of the piston, said member opening and closing this narrow opening. This valve member is mounted on the side of the piston opposite the pressure side so that the pressure of the hydraulic fluid which closes the check valve of the piston pushes this valve member into the open position. Hence, the valve member does not interfere with the hydraulic fluid passing through the narrow opening during the damped motion of the piston.

However, when the piston reaches the locking position, which corresponds, for example, to the open position of a lid or cover provided with the telescopic damper, the force of the compression spring associated with the valve member begins to act and presses the valve member against the fluid pressure into the closed position. Hence, the piston can no longer be moved out of this locking position since, on the one hand, the fluid pressure on the pressure side of the piston closes the check valve of the piston and since, on the other hand, the valve member, under the action of the compression spring, seals off the narrow opening in the piston. Hence, the piston is locked in this position.

In order to release the telescopic damper from this locked position, it is merely necessary to exert a pressure in the closing direction manually on the lid or cover. This pressure moves the piston out of its locking position. Since the piston is completely sealed by the check valve and the spring-loaded valve member, when this manual displacement of the piston takes place, the fluid pressure on the pressure side rises sharply very quickly so that the force acting through the fluid pressure on the valve member in its opening direction exceeds the force of the compression spring, urging the valve member in the closing direction, and the valve member clears the opening. The hydraulic fluid can then pass through the narrow opening and the damped motion of the piston begins. As soon as the piston is moved out of its locking position in this manner, the compression spring no longer acts on the valve member so that the piston can execute a damped movement.

Preferably the valve member is designed so that it exerts an axial pressure to open and close the opening. The compression spring that urges the valve member in the closing direction can therefore be a coil spring of simple design, whose axial length is only a fraction of the length of the cylinder so that the compression spring is only effective in the end area of travel of the piston that corresponds to its axial length. Since the spring force of such a coil spring increases continuously with its compression travel, the adjustment of the spring force to the fluid pressure, which in turn depends on the load on the piston, is insensitive. A higher load on the piston exerts a higher pressure on the pressure side of the cylinder and therefore a force which is stronger in the opening direction when it acts on the valve member. As a result, the piston position in which self-locking begins is displaced toward the bottom of the cylinder until the compression spring has been compressed to the point where its spring force exceeds the opening force of the valve member corresponding to the higher pressure. At this position, self-locking occurs in every position of the piston that corresponds to further compression of the compression spring. A suitable choice of the axial length and elastic hardness of the compression spring therefore makes it possible to set the range of piston travel in which self-locking occurs.

Of course, the hydraulic telescopic damper according to the invention can be used not only for covers or lids of instruments and housings, but can also be used everywhere that the mechanical movement of a part must be damped and this part must be locked automatically in the end position of its path of movement.

It is also obvious that the self-locking according to the invention can be used both in telescopic dampers in which the piston rod is extended out of the cylinder on the side away from the pressure, so that self-locking becomes effective when the piston rod is in the extended position, and in telescopic dampers in which the piston rod is brought out of the cylinder on the pressure side of the piston, so that self-locking becomes effective when the piston rod is in the retracted position.

The invention will now be described in greater detail with reference to the embodiment shown in the drawing.

The telescopic damper has a cylinder 10 which is closed, sealed, and filled with oil, in which cylinder a piston 12 is displaceably guided. Piston 12 rests on a piston rod 14, which is brought out through cylinder bottom 16 through a seal.

Figure 1:
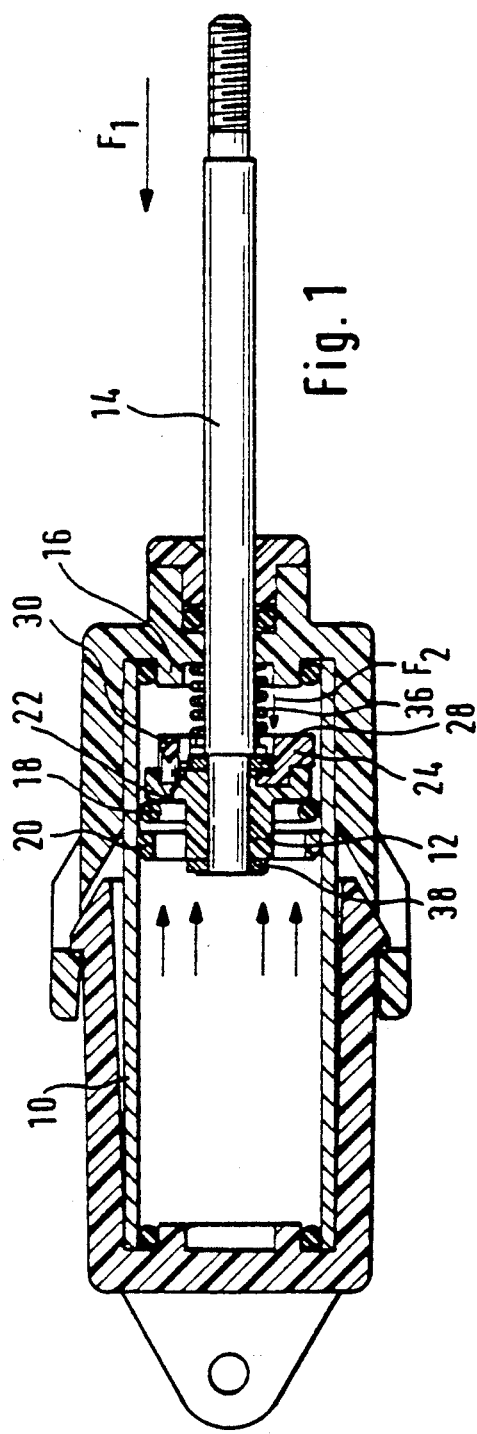
FIG. 1 is an axial section through a telescopic damper in the extended locked state.
Figure 2:
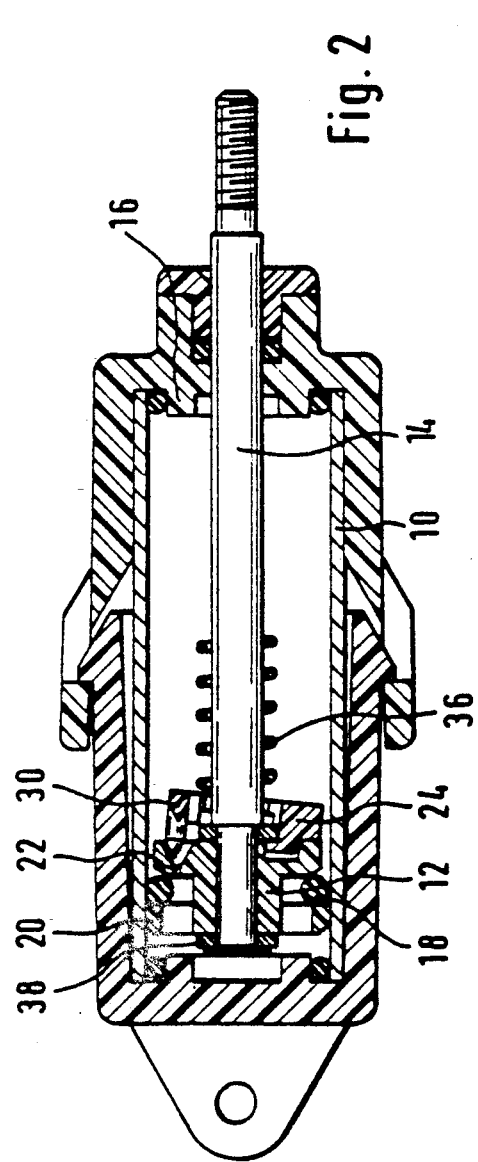
FIG. 2 is an axial section through this telescopic damper in the retracted state.

An annular gap is left between the outer circumference of piston 12 and the inside wall of cylinder 10. On the pressure side of the cylinder facing away from the piston rod, an O-ring 18 is mounted in front of this annular gap, said ring being held loosely in front of the annular gap by a cage 20 integrally molded on piston 12. O-ring 18 together with this annular gap forms a check valve. When the piston as shown in FIGS. 1 and 2 moves to the right into the extended position of the piston rod, O-ring 18 is raised away from the annular gap by the oil and the oil can pass unimpeded through the annular gap between piston 12 and the inside wall of cylinder 10. The piston therefore offers practically no resistance to this movement. When the piston is moved leftward into the retracted position of the piston rod, the oil forces O-ring 18 against the annular gap between piston 12 and the inside wall of cylinder 10, so that O-ring 18 closes this annular gap and seals it.

Piston 12 is traversed axially by a narrow opening 22 which is located eccentrically relative to the central axis, said opening serving to allow oil to pass with high flow resistance through piston 12 during the leftward movement of the piston, when the check valve formed by O-ring 18 is closed, so that a damped motion of piston 12 leftward is possible.

Figure 3:
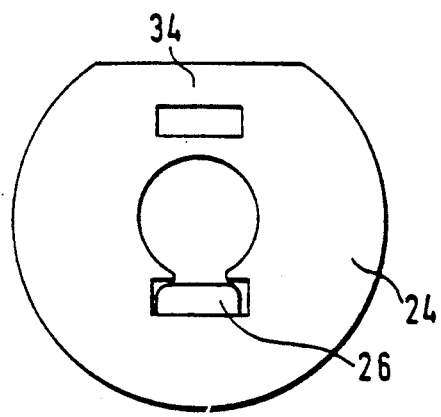
FIG. 3 is an enlarged axial view of the side of the valve part of this telescopic damper facing away from the piston.
Figure 4:
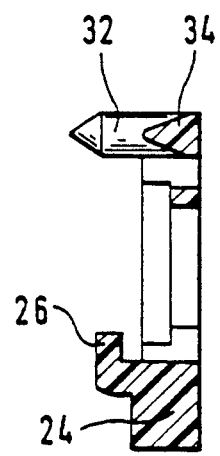
FIG. 4 is a section through the valve part along line A—A in FIG. 5.
Figure 5:
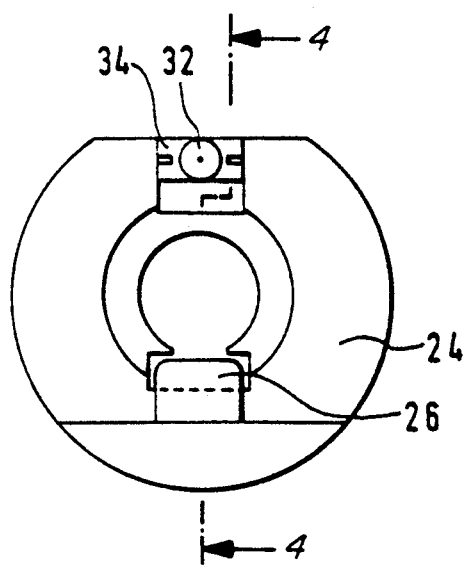
FIG. 5 is an axial view of the side of the valve part facing the piston.

On the side of piston 12 away from the pressure side of cylinder 10, a valve part 24 is mounted which is shown enlarged in FIGS. 3 to 5. Valve part 24 is designed as an annular disk loosely and movably surrounding piston rod 14. A nose 26 is molded on valve part 24, said nose projecting axially toward piston 12 and radially inward in the form of a hook. Nose 26 engages a recess of piston 12 and is held with play in this recess by a locking ring 28 resting on piston rod 14. The play of nose 26 in the recess of piston 12 and the radial play of valve part 24 on piston rod 14 are made sufficiently large that valve part 24 can be tilted around nose 26 axially relative to piston rod 14 and hence with respect to piston 12.

A valve member 30 is provided on valve part 24 diametrically with respect to nose 26, said member consisting of a metal valve needle 32 with a conical tip, mounted on a stub 34 of valve part 24. Valve member 30 engages opening 22 by valve needle 32 which projects axially toward piston 12, said opening being expanded conically to form a valve seat for the sealing engagement of valve needle 32.

A coil spring 36 acting as a compression spring is mounted on piston rod 14, said spring being displaceable loosely and axially on piston rod 14. The axial length of coil spring 36 constitutes only a fraction of the axial length of cylinder 10 and is, for example, on the order of magnitude of one-third of the length of cylinder 10.

Piston 12 is formed with cage 20 as a one-piece injection-molded plastic part. Valve part 24 is likewise a one-piece injection-molded plastic part on which metal valve needle 32 is mounted. For assembly, piston 12 and valve part 24 are held between two metal locking rings 28 and 38 on piston rod 14 with locking ring 28, as mentioned above, fitting radially over nose 26 of valve part 24 in order to mount valve part 24 tiltably on piston 12.

The telescopic damper operates as follows:

FIG. 2 shows the telescopic damper in the retracted position. Coil spring 36 rests loosely on piston rod 14, so that it exerts no force on valve part 24.

When the piston is moved to the right as the telescopic damper is extended, the oil flows from the piston rod side through the annular gap between piston 12 and the inside wall of cylinder 10 to the pressure side, while O-ring 18 is lifted off this annular gap and retained by cage 20.

During this extending motion of piston 12, coil spring 36 initially abuts cylinder bottom 16 with its right end and axially abuts, on the one hand, cylinder bottom 16 and, on the other hand, annular valve part 24. When piston 12 is moved further rightward, coil spring 36 is increasingly compressed so that it exerts a rising compressive force $F_2$ on valve part 24. Valve part 24 is pressed by this spring force $F_2$ against piston 12, so that valve needle 32 is forced into opening 22, sealing and closing the latter.

In the position of the extended telescopic damper shown in FIG. 1, said damper locks automatically. In this self-locking position, a force $F_1$ acts on the piston rod, e.g., the weight of an instrument lid in its open position. This force $F_1$ forces piston 12 leftward, causing O-ring 18 to rest in sealing fashion against the annular gap between piston 12 and the inside wall of cylinder 10. The check valve formed by O-ring 18 is therefore closed and opening 22 is likewise sealed by valve member 30. Piston 12 therefore completely seals off the pressure chamber of cylinder 10. As a result of the force $F_1$ and the spring force $F_2$ added to it, piston 12 is forced leftward, so that the hydraulic pressure on the pressure side of piston 12 rises steeply. As soon as the force exerted by the hydraulic pressure on the pressure side of piston 12 is equal to the sum of the forces $F_1$ and $F_2$, equilibrium is reached and piston 12 and piston rod 14 are held in this locking position. Spring force $F_2$, because of the small cross-sectional area of opening 22, holds valve member 30 against the hydraulic pressure, reliably sealing it against the hydraulic pressure on the pressure side of piston 12.

In order to move the telescopic damper out of its locking position, force $F_1$ acting on piston rod 14 is increased manually, for example, by exerting a pressure manually in the closing direction on the open instrument lid supported by the telescopic damper. As a result of this intensification of force $F_1$, piston 12 is displaced further leftward and the pressure on the pressure side of cylinder 10 rises because of the incompressibility of the oil to the point where valve member 30 is lifted off the valve seat of opening 22 against the force $F_2$ of coil spring 36, opening openings 22. Piston 12 can then be displaced leftward, and the oil can flow through opening 22. During this leftward movement of piston 12, coil spring 36 is increasingly relaxed, so that spring force $F_2$ decreases. Coil spring 36 can thus no longer keep valve member 30 closed and piston 12 can move leftward under the influence of force $F_1$, without requiring additional manual intensification of force $F_1$ The closed check valve of O-ring 18 and the narrow throughput cross-section of opening 22 result in a damped movement of the piston up to the end position shown in FIG. 2.

We claim:

1. A hydraulic telescopic damper comprising:
   a cylinder, said cylinder having a pressure side and a non-pressure side opposite said pressure side, and a first end at said pressure side and a second end opposite said first end at said non-pressure side,
   a piston in said cylinder, said piston having a first side facing towards said pressure side of said cylinder and a second side facing away from said pressure side of said cylinder, and said piston having a narrow opening therethrough between said first and second sides,
   a single check valve carried by said piston, and
   valve means for opening and closing said opening, said valve means comprising a movable valve member associated with said opening on said second side of said piston and compression spring means for moving said valve member into a position which closes said opening against hydraulic pressure to lock said piston when said piston nears said second end of said cylinder, said compression spring means being located axially between said valve member and said second end of said cylinder.

2. The hydraulic telescopic damper as claimed in claim 1, wherein said compression spring means is a coil spring, the axial length of said coil spring being less than the axial length of said cylinder.

3. The hydraulic telescopic damper as claimed in claim 2, further comprising a piston rod associated with said piston and an annular valve part movably mounted on said piston and surrounding said piston rod, wherein said valve member is mounted on said valve part and said coil spring is mounted on said piston rod and abuts said valve part.

4. The hydraulic telescopic damper as claimed in claim 1, wherein said valve member comprises a conical valve needle, and said opening having a conical seat for engagement by said valve needle.

5. The hydraulic telescopic damper as claimed in claim 1, wherein said piston and said cylinder define an annular gap therebetween, and wherein an O-ring is mounted on said pressure side of said cylinder in front of said annular gap, said O-ring together with said annular gap forming said single check valve.

6. A hydraulic telescopic damper comprising:
   a cylinder, said cylinder having a pressure side and a non-pressure side opposite said pressure side, and a first end at said pressure side and a second end opposite said first end at said non-pressure side,
   a piston in said cylinder, said piston having a first side facing towards said pressure side of said cylinder and a second side facing away from said pressure side of said cylinder, and said piston having a narrow opening therethrough between said first and second sides,
   a single check valve carried by said piston,
   valve means for opening and closing said opening, said valve means comprising a movable valve member associated with said opening on said second side of said piston and compression spring means for moving said valve member into a position which closes said opening against hydraulic pressure to lock said piston when said piston nears said second end of said cylinder, said compression spring means being located axially between said valve member and said second end of said cylinder, and
   a piston rod associated with said piston and an annular valve part movably mounted on said piston and surrounding said piston rod, wherein said valve member is mounted on said valve part and said coil spring is mounted on said piston rod and abuts said valve part,
   wherein said valve part comprises a conical valve needle spaced from said piston rod and mounting means for mounting said valve part for tilting movement on said piston to cause said valve needle to open and close said opening, wherein said valve needle and said opening are diametrically opposite said valve part.

* * * * *